United States Patent
Kimura et al.

(10) Patent No.: US 9,977,264 B2
(45) Date of Patent: May 22, 2018

(54) POLARIZING LENS FOR SUNGLASSES

(71) Applicants: MITSUBISHI GAS CHEMICAL COMPANY, INC., Tokyo (JP); MGC FILSHEET CO., LTD., Saitama (JP)

(72) Inventors: Hideaki Kimura, Saitama (JP); Terutaka Tokumaru, Tokyo (JP); Masayuki Akaki, Tokorozawa (JP); Kyousuke Nakamura, Chiba (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days. days.

(21) Appl. No.: 14/422,743

(22) PCT Filed: Aug. 19, 2013

(86) PCT No.: PCT/JP2013/072066
§ 371 (c)(1),
(2) Date: Feb. 20, 2015

(87) PCT Pub. No.: WO2014/030603
PCT Pub. Date: Feb. 27, 2014

(65) Prior Publication Data
US 2015/0248023 A1    Sep. 3, 2015

(30) Foreign Application Priority Data

Aug. 21, 2012 (JP) ................................. 2012-182332

(51) Int. Cl.
| G02C 7/10 | (2006.01) |
| G02B 5/22 | (2006.01) |
| G02C 7/12 | (2006.01) |
| G02B 5/30 | (2006.01) |
| B29D 11/00 | (2006.01) |

(52) U.S. Cl.
CPC .......... G02C 7/12 (2013.01); B29D 11/00644 (2013.01); G02B 5/223 (2013.01); G02B 5/305 (2013.01); G02B 5/3033 (2013.01)

(58) Field of Classification Search
CPC . G02C 7/12; G02C 7/10; G02C 7/101; G02B 27/2228; G02B 5/305; G02B 5/3033; G02B 5/223; B29D 11/00644
USPC .......................................................... 351/49
See application file for complete search history.

(56) References Cited

U.S. PATENT DOCUMENTS

| 5,770,316 A | 6/1998 | Starzewski | |
| 2006/0147652 A1* | 7/2006 | Liu | C09B 1/585 |
| | | | 428/1.31 |
| 2008/0111098 A1* | 5/2008 | Biteau | G02B 1/08 |
| | | | 252/62.51 C |
| 2009/0079913 A1* | 3/2009 | Nishikawa | G02B 5/3083 |
| | | | 349/106 |
| 2009/0267031 A1* | 10/2009 | Sano | C09B 31/22 |
| | | | 252/585 |
| 2012/0206689 A1* | 8/2012 | Ohkubo | G02B 1/04 |
| | | | 351/44 |
| 2013/0234082 A1* | 9/2013 | Lee | G02B 5/3033 |
| | | | 252/585 |

FOREIGN PATENT DOCUMENTS

| CN | 1140842 A | 1/1997 | |
| CN | 102576112 A | 7/2012 | |
| JP | 3-39903 | 2/1991 | |
| JP | 8-52817 | 2/1996 | |
| JP | 8-313701 | 11/1996 | |
| JP | 9-178944 | 7/1997 | |
| TW | 201121787 A1 | 7/2011 | |
| WO | 2011/049108 | 4/2011 | |
| WO | 2011/049108 A1 | 4/2011 | |
| WO | WO 2011049108 A1 * | 4/2011 | ............... G02B 1/04 |

OTHER PUBLICATIONS

Search report from PCT/JP2013/072066, dated Oct. 1, 2013.
European Search Report issued with respect to application No. 13831266.5, dated Feb. 17, 2016.
Chinese Office Action issued with respect to application No. 201380043169.9, dated Oct. 27, 2015.

* cited by examiner

*Primary Examiner* — William R Alexander
*Assistant Examiner* — Henry Duong
(74) *Attorney, Agent, or Firm* — Greenblum & Bernstein, P.L.C.

(57) ABSTRACT

Provided is a polarizing lens that is excellent in terms of impact resistance, prevention of eye strain, and a small variation of color tone or transparency or both. A sunglass polarizing lens that is formed by laminating a transparent protective sheet via an adhesive layer to each surface of a polarizing film that is made from polyvinyl alcohol and that is stretched and stained with dichroic organic dye; curving the resultant laminate so as to impart spherical or aspherical surfaces thereto to obtain a polarizing sheet; and injecting a transparent resin for a lens onto a surface of the polarizing sheet, wherein the polarizing film is stained by combined dichroic organic dyes so that the dichroic ratio of the film is within the range of from 5 to 14.

7 Claims, No Drawings

POLARIZING LENS FOR SUNGLASSES

TECHNICAL FIELD

The present invention relates to a curved polarizing lens that is obtained by curving a polarizing sheet to make a curved surface or an injection-molded polarizing lens that is obtained by injecting a transparent resin for a lens onto a surface of the curved polarizing lens. In particular, the polarizing lens of the present invention shows a small change in color during the curving process.

BACKGROUND

To make a polarizing sheet, generally a polarizing film that is obtained by absorbing or impregnating iodine or dichroic dyes into a monoaxially starched polyvinyl alcohol (PVA) film is used. Generally, transparent resins, such as triacetylcellulose, are used on one or both sides of the polarizing film as a protective layer to make a polarizing plate. Such a polarizing plate is easily handled and is useful for secondary processing. Further, it is cheap and light.

The polarizing sheet is obtained by affixing a transparent resin sheet such as an aromatic polycarbonate sheet as a protective layer on both sides of a polarizing film (hereafter, the "polarizing sheet"). Generally, the film is a stretched polyvinyl alcohol film dyed with dichroic dyes. The polarizing sheet, which is obtained by a curving process, an injection process, or both, is used in polarizing lenses for sunglasses or goggles. Depending on the properties of the resin, for example, if the resin is an aromatic polycarbonate, the sunglasses or the goggles have superior impact resistance, as well as high heat resistance.

In the case of sunglasses and goggles that require impact resistance and heat resistance, the aromatic polycarbonate that is derived from bisphenol A is suitably used. However, since the aromatic polycarbonate has a large photoelastic constant, if the aromatic polycarbonate is curved to make a spherical or aspherical surface, such as in sunglasses or goggles, interference fringes in coloration easily arise by the retardation of the polycarbonate, and as a result, the interference fringes cause problems such as deterioration in the appearance of articles and eyestrain.

Further, in a polarizing lens obtained by curving a polarizing sheet that uses an aromatic polycarbonate as a transparent sheet to make spherical or aspherical surfaces, because of unevenness of the thickness of the aromatic polycarbonate polarizing sheet, distortion of images occurs. Therefore, the polarizing lens has problems in terms of causing deterioration in appearance (of articles) and eyestrain.

For retardation that arises during the curving processes, the aromatic polycarbonate sheet that is used as a protective layer subjected to pre-extruding to make an aromatic polycarbonate sheet with invisible interference fringes in coloration as a result of the large retardation (hereafter referred to as a "stretched polycarbonate polarizing sheet") was known (Reference 1). Among various polarizing sheets, this sheet is used for articles that require an excellent appearance or that need to be very eye-friendly.

Further, in terms of improving the function of a polarizing lens that is obtained by curving the polarizing sheet, a polarizing lens that is obtained by curving a polarizing sheet to form a spherical or aspherical surface, inserting the curved polarizing sheet into a mold, and injecting a transparent resin to the mold to produce the lens (hereafter, "injecting polarizing lens"), is known. A polarizing lens that uses an aromatic polycarbonate as a resin is also known (hereafter "aromatic polycarbonate polarizing lens") (References 2 and 3).

The aromatic polycarbonate polarizing lens is made by injecting an aromatic polycarbonate into a mold to fill the aromatic polycarbonate [in the concave surface of the curved aromatic polycarbonate sheet]. This brings about a benefit wherein the unevenness of the thickness of the stretched polycarbonate sheet that is inserted in the mold disappears. Thus, even for lenses without focus refractivity, they are used in products that require particularly excellent impact resistance or appearance or that need to be very eye-friendly.

In lenses such as aromatic polycarbonate polarizing lenses, which are obtained by inserting thermosetting resins or thermoplastic resins into molds, the shape and thickness of the molded lenses can be freely set by setting the shape of the surface of both sides of the mold and the distance between the two sides accordingly. Thus, based on the optical design, the shape and the distance between the two sides of the mold can be set so as to have the desired values of focus refractivity, prism-diopter, and image distortion.

The surface shape of the molded lens and the surface shape of the mold at the time of contact with the molded lens are generally identical. However, if a very high level of precision of the surface shape of the lens is required, to compensate for a reduction in the thickness of the lens or a change in the surface shape, which are caused by shrinking of the volume when thermosetting resins or thermoplastic resins that are injected into molds solidify, the surface shape and the distance between the two sides of the mold should be adjusted accordingly.

The surface of the injecting polarizing lens that is produced in this way is subjected to further appropriate steps, such as forming a hard coat layer or an anti-reflection film, etc., and then polishing the rims of the lenses, drilling, screw fastening, etc., to fix the lens to the frame, thereby making sunglasses and goggles.

In the polarizing lens obtained by applying curving processes to the polarizing sheet to form a spherical or aspherical surface or the injecting polarizing lens obtained by injecting aromatic polycarbonate, etc., for the purpose of reducing the glare of the surface of glass, the surface of water, etc., polarized light in the horizontal direction is cut. In addition, for the purpose of improving visibility or design, for example, an aromatic polycarbonate polarizing sheet colored in grey, brown, or the like, is used to provide a desired color tone and transmittance.

In order to increase the degree of polarization of a polarizing lens, the amount of dichroic dye for dyeing a polyvinyl alcohol film is adjusted to a concentration at which the polarization component in the horizontal direction of light incident on the polarizing lens is almost absorbed. And when the amount of the dichroic dye for dyeing the polyvinyl alcohol film is further increased, the polarization component in the perpendicular direction of light incident on the polarizing lens is also absorbed in a large amount. For a higher performing polarizing lens, a polarizing lens that shows decreased absorbance of the polarization component in the perpendicular direction of light incident in the polarizing lens, by using a dichroic dye that shows a higher dichroic ratio, is required.

Further, regarding the dichroic dyes for dyeing the polyvinyl alcohol film, not a single color, but several colors of dichroic dyes are used. In this regard, by changing the amount of each dichroic dye for dyeing the polyvinyl alcohol film, a polarizing lens having a desired color tone and transmittance can be obtained. Further, a method to obtain a polarizing lens that has a color tone or transmittance of interest by dissolving the dyes in an adhesive layer or an aromatic polycarbonate sheet can be used. The method can control the color tone or the transmittance of an injecting polarizing sheet by itself or in combination with the steps explained above.

PRIOR ART DOCUMENTS

Patent Documents

Patent Document 1: Japanese Laid-Open Patent Publication No. H03-39903
Patent Document 2: Japanese Laid-Open Patent Publication No. H08-52817
Patent Document 3: Japanese Laid-Open Patent Publication No. H08-313701

SUMMARY OF THE INVENTION

Problems to be Solved by the Invention

As described above, an aromatic polycarbonate polarizing sheet is subjected to a curving process to provide a spherical or aspherical shape, or an aromatic polycarbonate polarizing sheet subjected to a curving process is then inserted into a mold, into which an aromatic polycarbonate is injected, thereby obtaining a polarizing lens that is excellent in terms of impact resistance, outer appearance and prevention of eyestrain.

However, in the case of an aromatic polycarbonate polarizing lens obtained by subjecting an aromatic polycarbonate polarizing sheet to a curving process to provide a spherical or aspherical shape or an aromatic polycarbonate polarizing lens obtained by further subjecting the sheet to injection molding, the color tone and transmittance of the aromatic polycarbonate polarizing sheet are significantly changed before and after the molding step, and as a result, there is a problem wherein the quality of finished products are varied.

It has been found by the studies of the inventors that under conditions in which a polarizing lens with good injection can be obtained, the color tone and transmittance of the injecting polarizing lens are not substantially changed at the process for injecting a transparent resin to mold a polarizing lens. Thus, it is found that the color change occurs during a curving process to curve the polarizing sheet to form a spherical or aspherical surface.

Thus, it was also found that, in the case of a polarizing lens obtained by subjecting an aromatic polycarbonate polarizing sheet to a curving process to provide a spherical or aspherical shape or an aromatic polycarbonate polarizing lens, since heating at the time of the curving process is carried out at a temperature around the glass-transition temperature of the aromatic polycarbonate, the color tone and the transmittance of the aromatic polycarbonate polarizing sheet are significantly changed, resulting in a significant difference between the qualities of the products.

In particular, there is a problem that in the case of an aromatic polycarbonate polarizing lens having a high dye concentration and a low transmittance, the color tone and transmittance of the aromatic polycarbonate polarizing sheet after molding are significantly changed compared to an aromatic polycarbonate polarizing lens having a low dye concentration and a high transmittance. In addition, there is a problem that when there is a significant change between color tone and transmittance before and after molding, the variations of the color tone and the transmittance of the finished products are not constant, resulting in differences between those molded products.

Means for Solving the Problems

As a result of studies to solve the above problems, the inventors found that in colored polarizing films, the change in color that is caused by heat during the processing steps can be reduced by staining the films so as to have a relatively low dichroic ratio. Further, the applicant also found that colored polarizing films that are stained so as to have smaller differences in the dichroic ratios in light wavelengths of blue, green, and red show more black tone in the cross-Nicol arrangement and show a small change in color caused by heating during the processing steps. Further, the applicants also found that even though the change in the transmittance of the colored polarizing films is the same, in the colored polarizing films that are stained so as to have relatively low dichroic ratio, such an unevenness of the transmittance is not seen as a large change in color tone. From these findings the applicants accomplished the present invention.

Namely, the present invention is a polarizing lens for sunglasses that is formed by laminating a transparent protective sheet via an adhesive layer to each surface of a polarizing film that is made from polyvinyl alcohol resin and that is stretched and stained with dichroic organic dyes; curving the resultant laminate so as to impart spherical or aspherical surfaces thereto to obtain a polarizing sheet; and injecting a transparent resin onto a surface of the curved polarizing sheet, wherein the polarizing film is stained by combined dichroic organic dyes so that the dichroic ratio of the film is within the range of from 5 to 14.

In the present invention, the dichroic ratio is obtained by combining the dichroic organic dyes and staining the polarizing film with the combined dichroic dyes so that the differences between the optical wavelength absorptions of blue (450 nm), green (550 nm), and red (650 nm) are 5 or less, especially 3 or less. Further, the polyvinyl alcohol resin film is monoaxially starched by a draw ratio of 3.5 to 6. The transparent protective sheet is selected from the group consisting of aromatic polycarbonates, polyacrylate, acetylcellulose, polyamide, and a composition of an aromatic polycarbonate and alicyclic polyester. The aromatic polycarbonate sheet has a retardation value of 3,000 nm or more and a thickness of 0.1-1 mm. In the adhesive layer, a two-liquid type thermosetting polyurethane resin that comprises a curative agent that comprises a polyurethane polymer and a hydroxyl (poly) acrylate is used. The transparent resin for lenses is an aromatic polycarbonate, polyamide, or (meth) acrylate.

Effects of Inventions

The present invention can stably provide polarizing sunglass lenses that have small differences in color tone changes and transmittance changes before and after molding and injecting processes. Therefore, the present invention can provide polarizing sunglass lenses that show more uniform properties.

Means for Solving the Problems

Below, the technical features of the present invention are explained.

A resin film, which is as a base material for a polarizing film, is swollen in water and then immersed in a dyeing solution containing the dichroic organic dyes of the present invention while being directionally stretched to disperse the dichroic dye in the base resin in an oriented state, thereby obtaining a polarizing film to which polarization properties have been imparted.

As the base material for the polarizing film to be used in this case, polyvinyl alcohols may be used. As polyvinyl alcohols, polyvinyl alcohol (hereinafter referred to as "PVA"), PVA in which a slight amount of the acetic acid ester structure remains, and PVA derivatives, or polyvinyl formal, polyvinyl acetal, saponified ethylene-vinyl acetate copolymer, etc., which are analogs of the PVA, are preferred, and PVA is particularly preferred.

Further, regarding the molecular weight of a PVA film, from the viewpoint of stretchability and film strength, the weight-average molecular weight is preferably 50,000 to 350,000, and particularly preferably 100,000 to 300,000. A molecular weight of 150,000 or more is particularly preferred. The scaling factor of stretching of the PVA film is preferably 2 to 8 times, and particularly preferably 3 to 6.5 times from the viewpoint of the dichroic ratio and film strength after stretching. 3.5 to 4.5 times is particularly preferred. The thickness of the PVA film after stretching is not particularly limited, but because the film tears easily when it is thin and the light transmission of the film is reduced when it is thick, the thickness of the film is preferably about 20 to 50 μm.

A typical manufacturing process in the case of using PVA as a base film is as follows:
(1) Washing PVA with water to remove impurities while swelling it with water,
(2) Stretching,
(3) Dyeing it in a dyeing tank,
(4) Forming bridges and chelation by using boric acid or a metal compound,
(5) Drying.

Steps (2), (3) (and optionally (4)), can be sequentially carried out or they can be carried out at the same time.

First, in the swelling and washing of step (1), by absorbing water, a PVA film that is easily broken in the dry state is uniformly softened to be stretchable at room temperature. Further, in this step, water-soluble plasticizers used in the manufacturing process of the PVA film are removed or optionally additives are preliminarily adsorbed. At this point, the PVA film is not uniformly and sequentially swollen and a variation in the degree of the swelling occurs. In this state, it is important to uniformly apply as small a force as possible to make uniform elongation and to avoid forming wrinkles. Further, in this step, it is most desirable that only uniform swelling uniformly, and excessive stretching should be minimized, since such stretching causes unevenness of the film.

In step (2), generally stretching is carried out so as to have 2 to 8 times the draw ratio. In the present inventions, maintaining good processability is important. Thus, the draw ratio of stretching of the PVA film should be selected from 3 to 6 times, preferably from 3.5 to 4.5 times. Further, at this time preferably the orientation of the PVA film is maintained. The orientation relaxation of the PVA film in a stretch orientation state is advanced the longer it is in water and the longer the start of the drying step is prolonged time. Thus, from the viewpoint of maintaining good properties, the time during stretching should be designed so as to be as short as possible. Further, after stretching excess water should be removed as soon as possible. In other words, it is preferable that the PVA film is immediately introduced into the drying step to dry it without excess heat load.

The dyeing of step (3) is accomplished by absorption or deposition of dyes to polymer chains of oriented polyvinyl alcohol film. From this mechanism, this step can be carried out before, at the same time as, or after the step for uniaxial stretching without a large variation. Since the interface is a surface with high restriction that can be easily oriented, it is preferable to select conditions that use this property. The temperature of step (3) is generally selected from 40-80° C. because of the requirement of high productivity. In the present invention, it is generally selected from 25-48° C., preferably 30-40° C., optionally 30-35° C.

Step (4) is carried out to improve resistance to heat, water, or organic solvents. Treatment with boric acid increases thermostability by forming cross bridges among PVA chains. This step can be carried out before, at the same time as, or after uniaxial stretching of the polyvinyl alcohol film without a large variation. Further, the latter, the metal compound, is used to form chelate compounds with dye molecules to stabilize. Generally, this step is carried out at or after the dyeing step.

As the metal compound, transition metals belonging to Period 4, Period 5 and Period 6 may be used. Among such metal compounds, those whose effects of heat resistance and solvent resistance have been confirmed exist, but from the viewpoint of cost, metal salts such as acetates, nitrates and sulfates of fourth-period transition metals such as chromium, manganese, cobalt, nickel, copper and zinc are preferred. Among them, compounds of nickel, manganese, cobalt, zinc and copper are more preferred because they are inexpensive and excellent in the aforementioned effects. More specific examples thereof include manganese (II) acetate tetrahydrate, manganese (III) acetate dihydrate, manganese (II) nitrate hexahydrate, manganese (II) sulfate pentahydrate, cobalt (II) acetate tetrahydrate, cobalt (II) nitrate hexahydrate, cobalt (II) sulfate heptahydrate, nickel (II) acetate tetrahydrate, nickel (II) nitrate hexahydrate, nickel (II) sulfate hexahydrate, zinc (II) acetate, zinc (II) sulfate, chromium (III) nitrate nonahydrate, copper (II) acetate monohydrate, copper (II) nitrate trihydrate and copper (II) sulfate pentahydrate. Any one of these metals may be used solely, and alternatively, a plurality of types of compounds may be used in combination.

Regarding the content of the metal compound and boric acid in the polarizing film, from the viewpoint of imparting heat resistance and solvent resistance to the polarizing film, the metal content of the metal compound is preferably 0.2 to 20 mg, and more preferably 1 to 5 mg, per 1 g of the polarizing film. The boron content of the boric acid is preferably 0.3 to 30 mg, and more preferably 0.5 to 10 mg. The composition of the treatment solution to be used for the treatment is set so as to satisfy the above-described content. In general, it is preferred that the concentration of the metal compound is from 0.5 to 30 g/L and that the concentration of boric acid is from 2 to 20 g/L. Analysis of the content of metal and boron in the polarizing film can be conducted using atomic absorption spectrometry.

Generally, the immersion temperature to be used is the same as the temperature of the dyeing step. The immersion temperature is preferably 20 to 70° C., and more preferably 20 to 45° C., more preferably 30 to 40° C., particularly preferably 30 to 35° C. Further, the immersion time in the step is selected from 0.5 to 15 minutes.

In Step (5), the PVA film, which was already stretched, dried, and suitably treated with boric acid or metal compounds, is dried. The PVA film has a heat resistance that depends on its moisture content. Thus, if the temperature increases when PVA film has a high moisture content, its uniaxal condition gets out of order, in a shorter period. Therefore, the dichroic ratio of the PVA film is decreased. Since the PVA film dries from its surface, preferably it dries from both surfaces. This step is preferably carried out by ventilation with dry air while removing vapor. Further, as is well known, to prevent excess heating, evaporated moisture is immediately removed to accelerate evaporation. Further, as is well known in the art, to prevent excess heating a method where evaporated moisture is immediately removed to accelerate evaporation is preferred. Such a method can dry the PVA film while suppressing a temperature increase. The temperature of the dry air is from the temperature that can substantially maintain the color of a dried film to generally 70° C. or higher, preferably at a temperature 90 to 120° C. for 1 to 120 minutes, preferably for 3 to 40 minutes.

The polarizing film of the present invention is produced in the method (steps) explained above by combining at least three types of dichroic organic dyes so as to have a dichroic ratio in the optical absorption wavelength of blue (450 nm), green (550 nm), and red (650 nm) of 5 to 14, more preferably so as to have a difference in optical absorption wavelength of 5 or less, preferably 3 or less. Further, the dichroic organic dyes are combined so that the polarizing film of the present invention has a degree of polarization in the light transmittance of interest of 99% or more, more preferably 99.9% or more. To minimize color change of the PVA film by heating during producing steps, as long as the essential transmittance is obtained, dichroic organic dyes that have smaller dichroic ratios are preferably used. Further, the closer the dichroic ratios of the optical absorption wavelengths of three the primary colors are to each other, at the heating process, a smaller color change in the color phase can be accomplished. Therefore, PVA film that shows a small change in color can be obtained. Further, to prevent coloration of a polarizing lens in a cross-Nicol arrangement, within the range of the wavelength, the PVA film that shows a dichroic ratio of interest is preferable. As is well known in the art, light transmittance (T), degree of polarization (P), and dichroic ratio (Rb) are denoted by a specific relational formula of an exponential correlation or a logarithmic function. For example, if the dichroic ratio is determined, a curve (of the formula) is obtained in which as the degree of polarization increases, the light transmittance decreases. In particular, when the degree of polarization shows 99% or higher, the light transmittance in the curve drastically decreases.

Dichroic organic dyes to be used are selected so that the dyed (stained) polarizing film shows a dichroic ratio of interest. Thus, the dichroic ratios of the dyes are not limited to the 5 to 14 range above. For example, dyes that have a ratio of 30 or more can be selected and used. Occasionally, dyes are not immobilized to a substrate, and therefore independently diffuse or rotate independent of PVA polymer chains. This is known as a main cause of color change [of the PVA film]. Even in the present invention, dyes that do not have or have less of these effects are preferable. Further, it is preferable to use dyes in which these effects are controlled, for example, by treatment with metal compounds.

In the points of stainability and heat resistance, direct dyes that comprise azo dyes that have a sulfonate group are preferable. The direct dyes are resolved or dispersed in a stain solution in an amount such that the polarizing film is stained at a color tone and transmittance of interest. Inorganic salts, such as sodium sulfate, as a dyeing aid are suitably added to the stain solution. In the present invention, the dichroic ratio of the dichroic organic dyes (pigments) means values measured in the maximum absorption wavelength of a polarizing film produced by using dichroic dyes instead of iodine under the manufacturing conditions where the polarizing film produced by using iodine shows dichroic ratios measured at 600 nm of 60 or more.

Specifically, exemplary azo dyes are listed in but are not limited to the following. The azo dyes are denoted by their trade names. Color Index Generic Names, where known, are in parentheses.

Chrysophenine (C.I. Direct Yellow 12)
Sumilight Supra Yellow BC conc (C.I. Direct Yellow 28)
Direct Yellow R 125% (C.I. Direct Yellow 50)
Kayarus Supra Yellow RL (C.I. Direct Yellow 86)
Kayarus Light Yellow F8G (C.I. Direct Yellow 87)
Kayarus Supra Yellow GLS (C.I. Direct Yellow 130)
Kayarus Yellow PG (C.I. Direct Yellow 142)
Kayacelon Yellow C-2RL (C.I. Direct Yellow 164)
Kayacelon Yellow C-2G
Direct Fast Orange S (C.I. Direct Orange 26)
Sumilight Supra Orange 2GL 125% (C.I. Direct Orange 39)
Nippon Fast Scarlet GSX (C.I. Direct Red 4)
Direct Fast Scarlet 4BS (C.I. Direct Red 23)
Nippon Fast Red BB conc (C.I. Direct Red 31)
Sumilight Red 4B (C.I. Direct Red 81)
Direct Supra Rubine BL (C.I. Direct Red 83)
Kayarus Supra Scarlet BNL 200 (C.I. Direct Red 89)
Direct Light Scarlet F2G (C.I. Direct Red 224)
Kayarus Supra Red BWS (C.I. Direct Red 243)
Kayacelon Rubine C-BL
Nippon Brilliant Violet BK conc (C.I. Direct Violet 9)
Kayarus Supra Violet 5BL conc (C.I. Direct Violet 48)
Sumilight Violet BB conc (C.I. Direct Violet 51)
Sumilight Supra Blue BRR conc (C.I. Direct Blue 71)
Sumilight Supra Blue G (C.I. Direct Blue 78)
Direct Supra Blue 4BL conc (C.I. Direct Blue 200)
Kayarus Supra Blue BWL 143 (C.I. Direct Blue 237)
Kayacelon Blue C-3GL(C.I. Direct Blue 274)
Kayacelon Blue C-2R (C.I. Direct Blue 291)
Direct Blue MRG
Kayarus Cupro Green G (C.I. Direct Green 59)
Kayarus Supra Green F4G
Japanol Fast Black D conc (C.I. Direct Black 17)
Sumilight Black G conc (C.I. Direct Black 19)
Direct Fast Black B (C.I. Direct Black 22)
Direct Fast Black conc (C.I. Direct Black 51)
Sumilight Supra Grey CGL (C.I. Direct Black 112)
Sumilight Supra Grey NGL conc (C.I. Direct Black 113)
Kayarus Supra Black AR 503
Kayarus Supra Brown GL 125 (C.I. Direct Brown 195)
Kayarus Supra Brown B2R (C.I. Direct Brown 209)
Kayarus Supra Brown GTL (C.I. Direct Brown 210)

Next, a transparent protection film or sheet is laminated to each surface of the polarizing film produced by the processes above via an adhesive layer to produce (be used as) a polarizing sheet. Transparent plastic materials that are used for the present inventions are selected from transparent resins consisting of aromatic polycarbonates, noncrystal polyolefins (alicyclic polyolefins), polyacrylate, polysulfate, acetylcellulose, polystylene, polyester, transparent polyaide, and a composition of aromatic polycarbonate and alicyclic polyester, and mixtures thereof. In the cases of sunglasses or goggles that require impact resistance and heat resistance, aromatic polycarbonates derived from bisphenol A are preferably used. A composition of polycarbonate/PCC (poly (1,4-cyclohexane dimethanol-1,4-cyclohexane dicarboxylate)) has impact resistance and can be used for a curving process at a relatively low temperature. In the case that chemical resistance is required, polyolefines, polyacrylates, and polyadides are preferable.

As a resin material for the aromatic polycarbonate sheet to be used in this case, from the viewpoint of film strength, heat resistance, durability or curving workability, polymers produced according to the well-known method from a bisphenol compound typified by 2,2-bis(4-hydroxyphenyl) alkane or 2,2-(4-hydroxy-3,5-dihalogenophenyl)alkane are preferred, and the polymer skeleton thereof may include a structural unit derived from a fatty acid diol or a structural unit having ester bonds. In particular, an aromatic polycarbonate induced from 2,2-bis(4-hydroxyphenyl)propane is preferred.

Regarding the molecular weight of the aromatic polycarbonate sheet, from the viewpoint of formation of the sheet itself, the viscosity-average molecular weight is preferably 12,000 to 40,000, and from the viewpoint of film strength, heat resistance, durability, or curving workability, the viscosity-average molecular weight is particularly preferably 20,000 to 35,000 Regarding the retardation value of the aromatic polycarbonate sheet, from the viewpoint of suppression of the colored interference fringe, the lower limit thereof is preferably 2,000 nm or higher. The upper limit thereof is not particularly limited, but from the viewpoint of the film production, the upper limit is preferably 20,000 nm or lower, and particularly preferably 4,000 nm or higher and 20,000 nm or lower. When the retardation value is higher, a colored interference fringe is not easily generated, but there is a disadvantage in that the surface shape is easily deformed. The aromatic polycarbonate sheet that has a high retardation value can be used on the side where the light enters, i.e., on the opposite side of human eye, to prevent colored interference fringe.

Alicyclic polyester resins used as a component of a composition of aromatic polycarbonate, a sheet or film of the protective layers, and a resin for injection molding to produce lens, are obtained by well-known methods for example esterification or transesterification of dicarboxylic acid components represented by 1,4-cyclohexane dicarboxylic acid, a diol components represented by 1,4-cyclohexane dimethanol, and minor components if required, followed by a polycondensation reaction that is carried out by suitably adding polymerization catalysts, and gradually reducing the pressure of the reactor.

Specific alicyclic dicarboxylic acid and ester-forming derivatives thereof are 1,2-cyclohexane dicarboxylic acid, 1,3-cyclohexane dicarboxylic acid, 1,4-cyclohexane dicarboxylic acid, 1,4-decahydronaphthalene dicarboxylic acid, 1,5-decahydronaphthalene dicarboxylic acid, 2,6-decahydronaphthalene dicarboxylic acid, 2,7-decahydronaphthalene dicarboxylic acid, and ester-forming derivatives thereof.

Polyamide resins used in the present invention are indicated as those known as polyamide resins for producing lenses. The heat deformation temperature, which is an index for heat resistance, of such polyamide resins is in a range from 100° C. to 700° C. Specific polyamide resins are aromatic polyamide resins, alicyclic polyamide resins, aliphatic polyamide resins, and copolymers thereof. The alicyclic polyamide resins are preferable in terms of their mechanical strength, chemical resistance, transparency, etc. However, two or more types of polyamide resins can be combined. Exemplary combined polyamide resins are but are not limited to GLILAMID TR FE5577, XE 3805 (EMS), NOVAMID X21 (Mitsubishi Engineering-Plastics), Toyobo Nylon T-714E (Toyobo).

(Meth)acrylic resins may be homopolymers of each (meth)acrylic ester, such as polymethyl methacrylate (PMMA), methyl methacrylate, or copolymers of PMMA, MMA, and one or more of their monomers, or mixtures of some of these polymers. A (meth)acrylate that has a cyclic alkyl structure is preferable because it has low birefringence, low hygroscopicity, and high heat resistance. Examples of such (meth)acrylic-based resins include Acrypet (trademark; produced by Mitsubishi Rayon Co., Ltd.), Delpet (trademark; produced by Asahi Kasei Chemicals Corporation), Parapet (trademark; produced by Kuraray Co., Ltd.), and the like.

According to the present invention, an adhesive layer is used for bonding a transparent protective layers and the polarizing film. Usable adhesives include acrylic resin-based materials, urethane resin-based materials, polyester resin-based materials, melamine resin-based materials, epoxy resin-based materials, silicone resin-based materials, and the like. Specifically from the viewpoint of adhesiveness with aromatic polycarbonate and adhesiveness with the polarizing layer or the photocromic layer, a two-liquid thermosetting urethane resin containing a polyurethane prepolymer, which is a urethane resin-based material, and a curing agent are preferable. The structures of layers of the polarizing film of the present invention are not limited to those explained above. For the adhesive agents that bind the polarizing film and transparent protective layers, polarizing sheets may be used that also have photocromic properties produced by using adhesive agents that are obtained by dissolving photocromic dyes.

The protective layers of the present invention are selected based on producing conditions that do not substantially change the functions of the functional layers under suitable processing conditions. For example, when selective reflection films that consist of polyester-based super multi layers are used together with the transparent protective layers, to make the thickness of a single layer of the super multi layers ¼λ, production and stretching of multi-layer sheets are repeated until it has an optical thickness of interest. (This is the same principal as that for producing cylindrical candy in which a design appears in the cross section wherever it is sliced.) Thus, for processing conditions under which the functions of the protecting layers are maintained, it is necessary to select temperatures and time so that the protection layers do not substantially relax from a stretched state during the processing steps.

Next, the polarizing sheet of the present invention goes through a punching process to produce lens shaped products. Then, the products undergo a curving process. From the viewpoint of the productivity of each lens-shaped product, the process to produce lens shaped products is carried out by using a punching blade that consists of a Thomson blade to punch plural lens-shaped products. The specific shape of each lens-shaped product is selected based on the configuration of the finished product (such sunglasses, goggles). Typical lens-shaped product is a disk that has an 80 mm diameter or a slit shape that is cut in the same width at both ends in a direction perpendicular to the polarization axis. Further, as explained in the section about the selection of the type of protection sheet of the polarizing sheet of the present invention, the conditions of the curving process are determined based on the conditions where degradation of layers that demonstrate the functionality of the polarizing sheet do not occur substantially.

When the stretched aromatic polycarbonate sheet is used as a protection sheet for the polarizing sheet, since the polarizing film is easy to tear along the stretched direction, conditions are selected so as to not make such tears. The temperature of the mold in the curving process of the stretched aromatic polycarbonate polarizing sheet is preferably around the glass transition temperature of the aromatic polycarbonate used in the stretched polycarbonate polarizing sheet. Further, preferably, the temperature of the stretched polycarbonate polarizing sheet just before the curving process is controlled by a preheating treatment to be within the range of from a temperature 50° C. less than the glass transition temperature of the aromatic polycarbonate to a temperature less than the glass transition point. In particular, a temperature lower than 40° C. less than the glass transition temperature of the aromatic polycarbonate to a temperature less than 5° C. lower than the glass transition temperature is preferable. This is also true in the case of other resin in that molding (curving) temperatures that are less than the glass transition temperature of resins used are suitably selected.

Next, resins that are generally the same as resins used as the protection sheet are injected into the curved polarizing sheet. Conditions for injection molding are not particularly limited, but an excellent outer appearance is required. From this point, the mold temperature is preferably a temperature that is equal to or higher than a temperature 50° C. lower than the glass-transition temperature of the transparent resin used for the stretched polycarbonate polarizing sheet and lower than the glass-transition temperature, and particularly preferably a temperature that is equal to or higher than a temperature 40° C. lower than the glass-transition temperature and lower than a temperature 15° C. lower than the glass-transition temperature.

Next, the hard coating treatment may be carried out. The materials for hard coating and the processing conditions are not particularly limited, but an excellent outer appearance and adhesiveness with respect to the aromatic polycarbonate as the base or inorganic layers such as a mirror coat and an antireflection coat to be subsequently applied are required. From this viewpoint, the firing temperature is preferably a temperature that is equal to or higher than a temperature 50° C. lower than the glass-transition temperature of the aromatic polycarbonate used for the stretched polycarbonate polarizing sheet and lower than the glass-transition temperature, and particularly preferably a temperature that is equal to or higher than a temperature 40° C. lower than the glass-transition temperature and lower than a temperature 15° C. lower than the glass-transition temperature, i.e., a temperature around 120° C. The time required for firing the hard coat is about 30 minutes to 2 hours.

EXAMPLES

Example 1

(a) Polarizing Film

Polyvinyl alcohol (Kuraray Co., Ltd., trade name: VF-PS#7500) was swollen in water at 35° C. for 270 seconds while being stretched two times.

After that, it was dyed in an aqueous solution containing Kayarus Supra Yellow GLS (C.I. Direct Yellow 130), Kayarus Supra Red BWS (C.I. Direct Red 243), Kayacelon Blue C-3GL (C.I. Direct Blue 274) and 10 g/L of an anhydrous sodium sulfate at 35° C.

This dyed film was immersed in an aqueous solution containing 2.3 g/L of nickel acetate and 4.4 g/L of boric acid at 35° C. for 120 seconds while being stretched four times. The film was dried at room temperature for 3 minutes in a state wherein the tension was retained, and then subjected to a heating treatment at 110° C. for 3 minutes, whereby a polarizing film was obtained.

The results of the dichroic ratio of the obtained polarizing film at the optical wavelength absorptions of blue (450 nm), green (550 nm), and red (650 nm) are shown in Table 1. The dichroic ratio was obtained by the following formula:

Dichroic ratio=$Az/Ax$ wherein, Ax represents the absorbance of linearly-polarized light in the maximum transmission direction, and Az represents the absorbance of linearly-polarized light in a direction perpendicular to the maximum transmission direction. Ax and Az were measured by allowing the linearly-polarized light to be incident on the sample, using a spectrophotometer manufactured by Shimadzu Corporation (UV-3600).

Next, the degree of polarization and color tones at the cross-Nicol arrangement of the obtained polarizing film are shown in Table 1. The degree of polarization was obtained by the following formula:

Degree of polarization=100×($\tau p$max−$\tau p$min)/ ($\tau p$max+$\tau p$min), wherein, $\tau p$max is the maximum value of luminous transmittance measured by the incident of linearly polarized light and $\tau p$min is the minimum value of luminous transmittance measured by the incident of linearly polarized light. $\tau p$max and $\tau p$min are the values that express Ax and Az as the luminous transmittance.

Since in the cross-Nicol state light is absorbed into each of a transmission axis and an absorption axis, the spectrum at the cross-Nicol arrangement can be denoted by Az×Ax. Thus, color tones at the cross Nicol arrangement can be calculated by using an L*a*b* color system from the spectrum.

In the color tone at the cross-Nicol arrangement, b* was low. Thus, the object (the polarizing film) was seen to be bluish. However, its degree of polarization was more than 99%. Thus, it is satisfactory as a practical matter.

(b) Aromatic Polycarbonate Polarizing Sheet

A urethane-based adhesive was applied to the polarizing film obtained in (a) using a bar coater #12, then dried at 70° C. for 10 minutes. After that, an aromatic polycarbonate sheet having a thickness of 0.3 mm and a retardation value of 5500 nm (Mitsubishi Gas Chemical Co., Inc.) was bonded to the polarizing film using a laminating machine so that both the stretch axis of the aromatic polycarbonate sheet and the stretch axis of the polarizing film were in a direction horizontal to the polarizing lens.

The adhesive was applied to the polarizing film side of the laminated sheet in the same manner as above, and another aromatic polycarbonate sheet was bonded thereto in the same way, whereby an aromatic polycarbonate polarizing sheet was obtained. The thickness of the coated adhesive after curing was 9 to 11 μm.

(c) Measurement of Absorbance of Aromatic Polycarbonate Polarizing Lens

The transmittance and color tone of the prepared aromatic polycarbonate polarizing sheet were measured using a spectrophotometer manufactured by Shimadzu Corporation (UV-3600). The results are shown in Table 2.

(d) Aromatic Polycarbonate Polarizing Lens

The aromatic polycarbonate polarizing sheet obtained in (b) was subjected to the curving process using a mold having a base curve of 7.95 (curvature radius 66.67 mm). In the curving process, the forming was carried out under the following conditions: mold temperature: 137° C., and retention time: 1200 seconds. The base curve as used herein refers to the curvature of the front surface of the lens, and it is a value obtained by dividing 530 by the curvature radius (in millimeters).

There were no cracks in the polarizing film of the aromatic polycarbonate polarizing lens after the curving process.

The transmittance and color tone of the aromatic polycarbonate polarizing lens after the curving process of samples measured in a manner similar to that in (c), and the color difference ΔE*ab in the CIE1976 (L*a*b*) color space before and after forming are shown in Table 1. The color difference was obtained by the following formula:

Color difference: ΔE*ab=((ΔL*)^2+(Δa*)^2+(Δb*)^2)^(½)

Example 2

Polarizing films were obtained in a manner similar to that in (a), except that the combination of dyes was changed to Direct Yellow R 125% (C.I. Direct Yellow 50), Direct Supra Rubine BL (C.I. Direct Red 83), Sumilight Supra Blue G (C.I. Direct Blue 78).

The dichroic ratio, the degree of polarization, and the color tone at the cross-Nicol arrangement, at optical absorption wavelengths of blue (450 nm), green (550 nm), and red (650 nm) of the obtained polarizing films, are shown in Table 1.

The difference in the dichroic ratio of the optical absorption wavelength of blue, green, and red of the polarizing films was 4.6. Thus, the degree of polarization became 99.7%. The color tone at the cross-Nicol arrangement was almost black.

Next, as in (b), (c), and (d), the transmittance and the color tone of the aromatic polycarbonate polarizing lens before and after the curving process were measured to obtain the color difference. The results are shown in Table 2.

As in Example 1, the polarizing film in the aromatic polycarbonate polarizing lens after the curving process did not have any cracks.

Example 3

Polarizing films were obtained in a manner similar to that in (a), except that the combination of dyes was changed to Kayarus Supra Yellow GLS (C.I. Direct Yellow130), Sumilight Supra Orange 2GL 125% (C.I. Direct Orange 39), Kayarus Supra Red BWS (C.I. Direct Red 243), Sumilight Red 4B (C.I. Direct Red 81), Kayacelon Blue C-3GL (C.I. Direct Blue 274).

The dichroic ratio, the degree of polarization, and the color tone at the cross-Nicol arrangement, at optical absorption wavelengths of blue (450 nm), green (550 nm), and red (650 nm) of the obtained polarizing films, are shown in Table 1.

The difference in the dichroic ratio of the optical absorption wavelength of blue, green, and red of the polarizing films was 3.6. Thus, the degree of polarization became 99.9%. The color tone at the cross Nichol arrangement was almost black.

Next, as in (b), (c), and (d), the transmittance and the color tone of the aromatic polycarbonate polarizing lens before and after the curving process were measured to obtain the color difference. The results are shown in Table 2.

As the same as Example 1, the polarizing film in the aromatic polycarbonate polarizing lens after the curving process did not have any crack.

Example 4

Polarizing films were obtained in a manner similar to that in (a), except that the combination of dyes was changed to Sumilight Supra Orange 2GL 125% (C.I. Direct Orange 39), Sumilight Red 4B (C.I. Direct Red 81), Kayarus Supra Blue BWL 143 (C.I. Direct Blue 237).

The dichroic ratio, the degree of polarization, and the color tone at the cross-Nicol arrangement, at optical absorption wavelengths of blue (450 nm), green (550 nm), and red (650 nm) of the obtained polarizing films, are shown in Table 1.

The difference in the dichroic ratio of the optical absorption wavelengths of blue, green, and red of the polarizing films was 1.9. Thus, the degree of polarization became 99.9%. The color tone at the cross Nichol arrangement was black.

Next, as in (b), (c), and (d), the transmittance and the color tone of the aromatic polycarbonate polarizing lens before and after the curving process were measured to obtain the color difference. The results are shown in Table 2.

As in Example 1, the polarizing film in the aromatic polycarbonate polarizing lens after the curving process did not have any cracks.

TABLE 1

| | Dichroic ratios of polarizing films | | | | Color tone at the cross-Nichol arrangement | | |
|---|---|---|---|---|---|---|---|
| | Blue (450 nm) | Green (550 nm) | Red (650 nm) | Degree of polarization (%) | L* | a* | b* |
| Example 1 | 6.4 | 8.2 | 12.8 | 99.3 | 0.6 | −0.2 | −4.0 |
| Example 2 | 7.4 | 11.1 | 12.0 | 99.7 | 0.2 | −0.2 | −1.8 |
| Example 3 | 10.3 | 9.2 | 12.8 | 99.9 | 0.1 | −0.1 | −0.1 |
| Example 4 | 11.6 | 10.7 | 12.6 | 99.9 up | 0.0 | 0.0 | −0.0 |

TABLE 2

| | Color tones before curving | | | | Color tones after curving | | | | Color difference ΔE*ab |
|---|---|---|---|---|---|---|---|---|---|
| | Transmittance (%) | L* | a* | b* | Transmittance (%) | L* | a* | b* | |
| Example 1 | 20.2 | 52.1 | 0.5 | −2.6 | 18.9 | 50.5 | 0.9 | −3.3 | 1.8 |
| Example 2 | 18.9 | 50.6 | 1.3 | −3.0 | 17.3 | 48.7 | 1.7 | −3.8 | 2.1 |
| Example 3 | 20.1 | 52.0 | −0.6 | −2.8 | 18.4 | 50.0 | −0.2 | −3.2 | 2.1 |
| Example 4 | 18.1 | 49.6 | 1.4 | −4.1 | 16.5 | 47.6 | 2.1 | −4.9 | 2.3 |

As is clearly understood from these examples, in aromatic polycarbonate polarizing lenses that use the polarizing film stained by the dichroic dyes so as to have a dichroic ratio of 5 to 14 at the optical absorbance wavelength of blue (450 nm), green (550 nm), and red (650 nm), the color difference before and after the curving process were small. Further, the changes in the color tone and the transmittance before and after the curving process were also small.

The invention claimed is:

1. A polarizing lens for sunglasses that is formed by
laminating a transparent protective sheet via an adhesive layer to each surface of a polarizing film that is made from oriented polyvinyl alcohol resin and that is monoaxially stretched and stained with dichroic organic dyes to absorb the dichroic organic dyes into or deposit the dichroic organic dyes onto polymer chains of the monoaxially stretched polyvinyl alcohol resin;
curving the resultant laminate so as to impart spherical or aspherical surfaces thereto to obtain a polarizing sheet; and
injecting a transparent resin onto a surface of the curved polarizing sheet,
wherein the polarizing film is stained by combined three or more dichroic organic dyes so that the dichroic ratio of the film is within the range of from 5 to 14;
wherein the dichroic ratio is obtained by combining the dichroic organic dyes and staining the polarizing film with the combined dichroic dyes so that the differences between the optical wavelength absorptions of blue (450 nm), green (550 nm), and red (650 nm) are 5 or less.

2. The polarizing lens for sunglasses of claim 1, wherein the dichroic ratio is obtained by combining dichroic organic dyes and staining the polarizing film with the combined dichroic dyes so that the differences between optical wavelength absorptions of blue (450 nm), green (550 nm), and red (650 nm) are 3 or less.

3. The polarizing lens for sunglasses of claim 1, wherein the polyvinyl alcohol resin film is monoaxially stretched by a draw ratio of 3.5 to 6.

4. The polarizing lens for sunglasses of claim 1, wherein the transparent protective sheet is selected from the group consisting of aromatic polycarbonates, polyacrylate, acetylcellulose, polyamide, and a composition of an aromatic polycarbonate and alicyclic polyester.

5. The polarizing lens for sunglasses of claim 1, wherein the transparent protective sheet is a film or a sheet made from an aromatic polycarbonate resin and the film or the sheet has a retardation value of 3,000 nm or more and a thickness of 0.1-1 mm.

6. The polarizing lens for sunglasses of claim 1, wherein in the adhesive layer, a 2-liquid type thermosetting polyurethane resin that comprises a curative agent that comprises a polyurethane polymer and a hydroxyl (poly) acrylate is used.

7. The polarizing lens for sunglasses of claim 1, wherein the transparent resin for lenses is an aromatic polycarbonate, polyamide, or polyacrylate.

* * * * *